United States Patent
Nishikawa et al.

(10) Patent No.: US 7,472,139 B2
(45) Date of Patent: Dec. 30, 2008

(54) DATABASE RECOVERY METHOD APPLYING UPDATE JOURNAL AND DATABASE LOG

(75) Inventors: Norifumi Nishikawa, Machida (JP); Takashi Oeda, Sagamihara (JP); Nobuo Kawamura, Atsugi (JP); Kazuhiko Mogi, Sagamihara (JP)

(73) Assignee: Hitachi, Ltd., Tokyo (JP)

(*) Notice: Subject to any disclaimer, the term of this patent is extended or adjusted under 35 U.S.C. 154(b) by 312 days.

(21) Appl. No.: 11/386,982

(22) Filed: Mar. 23, 2006

(65) Prior Publication Data

US 2007/0185923 A1    Aug. 9, 2007

(30) Foreign Application Priority Data

Jan. 27, 2006   (JP)   .............................. 2006-019245

(51) Int. Cl.
G06F 17/30    (2006.01)
(52) U.S. Cl. .................... 707/202; 707/100; 707/104.1; 707/200; 707/203; 707/204
(58) Field of Classification Search ...... 707/100–104.1, 707/200–204; 714/15, 16, 20
See application file for complete search history.

(56) References Cited

U.S. PATENT DOCUMENTS

| | | | |
|---|---|---|---|
| 5,381,545 A | 1/1995 | Baker | |
| 6,877,109 B2 * | 4/2005 | Delaney et al. | 714/6 |
| 7,353,305 B2 * | 4/2008 | Pangal et al. | 710/74 |
| 2004/0268067 A1 | 12/2004 | Yamagami | |
| 2005/0028022 A1 | 2/2005 | Amano | |

FOREIGN PATENT DOCUMENTS

JP    2005-018738    1/2005

* cited by examiner

Primary Examiner—Cam-Linh Nguyen
(74) Attorney, Agent, or Firm—Mattingly, Stanger, Malur & Brundidge, PC (57) ABSTRACT

A database recovery method including a computer and a storage system, in which: the storage system includes a disk drive for storing data; the disk drive includes a data volume, a snapshot volume, a database log for storing an update log, and an update journal for storing update information of the data volume; a recovery point for indicating an end point of a range to which the update journal is to be applied and a starting point of a range to which the database log is to be applied is recorded to recover the data volume; and when the database is to be recovered, the update journal is applied to the snapshot volume up to the recovery point, the snapshot volume after the update is switched to the data volume, and the database log after the recovery point is applied to the data volume that is set by switching.

12 Claims, 10 Drawing Sheets

FIG. 1

| VOLUME ID (701) | SERVER ID (702) | TYPE (703) | DISK DRIVE ID (704) | START/END BA (705) | BASE VOLUME (706) |
|---|---|---|---|---|---|
| 110A | 1A | NORMAL | 26A | 0 - 999 | |
| 110B | 1A | NORMAL | 26B | 0 - 999 | |
| 110C | 1A | SNAPSHOT | 26C | 0 - 999 | 110A |
| 110D | 1A | JOURNAL | 26D | 0 - 999 | 110A |

| LOG SEQUENCE NUMBER (401) | LOG RECORD (402) |
|---|---|
| 1 | LOG DATA |
| : | : |
| 1000 | LOG DATA |
| 1001 | CHECKPOINT START |
| 1002 | LOG DATA |
| : | : |
| 1050 | LOG DATA |
| 1051 | CHECKPOINT END |
| : | : |

| UPDATE NUMBER (201) | LBA (202) | DATA (203) |
|---|---|---|
| 1 | 100 | ... |
| 2 | 5 | ... |
| 3 | 256 | ... |
| 4 | 300 | ... |
| 5 | 20 | ... |
| 6 | 10 | ... |
| 7 | 40 | ... |
| 8 | 170 | ... |

| UPDATE NUMBER (301) | LOG SEQUENCE NUMBER (302) |
|---|---|
| 2 | 500 |
| 8 | 1051 |

| VOLUME ID | SERVER ID | TYPE | DISK DRIVE ID | START/END BA | BASE VOLUME | |
|---|---|---|---|---|---|---|
| 110A | 1A | NORMAL | 26A | 0 - 999 | | ⟵ 707A |
| 110B | 1A | NORMAL | 26B | 0 - 999 | | ⟵ 707B |
| 110C | 1A | SNAPSHOT | 26C | 0 - 999 | 110A | ⟵ 707C |
| 110D | 1A | JOURNAL | 26D | 0 - 999 | 110A | ⟵ 707D |
| 110E | 1B | NORMAL | 26A | 1000 - 1999 | | ⟵ 707E |
| 110F | 1B | NORMAL | 26B | 1000 - 1999 | | ⟵ 707F |
| 110G | 1B | SNAPSHOT | 26C | 1000 - 1999 | 110E | ⟵ 707G |
| 110H | 1B | JOURNAL | 26D | 1000 - 1999 | 110E | ⟵ 707H |

*FIG. 11*

| LOG SEQUENCE NUMBER | LOG RECORD |
|---|---|
| 1 | LOG DATA |
| ⋮ | ⋮ |
| 2000 | LOG DATA |
| 2001 | CHECKPOINT START |
| 2002 | LOG DATA |
| ⋮ | ⋮ |
| 2050 | LOG DATA |
| 2051 | CHECKPOINT END |
| ⋮ | ⋮ |

*FIG. 12*

| UPDATE NUMBER (201) | LBA (202) | DATA (203) |
|---|---|---|
| 1 | 300 | ... |
| 2 | 55 | ... |
| 3 | 556 | ... |
| 4 | 400 | ... |
| 5 | 20 | ... |
| 6 | 210 | ... |
| 7 | 540 | ... |
| 8 | 170 | ... |

| UPDATE NUMBER (301) | LOG SEQUENCE NUMBER (302) |
|---|---|
| 1 | 1500 |
| 6 | 2051 |

DATABASE RECOVERY METHOD APPLYING UPDATE JOURNAL AND DATABASE LOG

CLAIM OF PRIORITY

The present application claims priority from Japanese patent application P2006-019245 filed on Jan. 27, 2006, the content of which is hereby incorporated by reference into this application.

BACKGROUND

This invention relates to an operation of a computer system, and more particularly, to a method of recovering a database managed by a database management system introduced to a computer system.

A computer system including a database server and a storage system is required to promptly recover the database when an error is caused by an unexpected accident, disaster, or the like.

U.S. Pat. No. 5,381,545 discloses a technique relating to the recovery of the database. According to U.S. Pat. No. 5,381,545, a database management system stores the first transaction after the acquisition of a backup, in a database log (DB log) corresponding to an update log. Then, the database management system applies the DB log from the position where the transaction is stored to the backup data so as to recover the database.

JP 2005-018738 A discloses a method of recovering a volume using a snapshot and an update journal of a storage system. According to JP 2005-018738 A, the storage system retains a snapshot and an update journal of a volume to be recovered. The snapshot corresponds to a copy of the volume to be recovered at a certain point of time. The update journal retains update information of the target volume after the snapshot is obtained. Upon occurrence of an error in the volume, the storage system applies the information of the update journal to update the snapshot, thereby recovering the volume.

SUMMARY

In the related art disclosed in U.S. Pat. No. 5,381,545, backup data is expanded in a storage medium of the storage system to apply the DB log so as to recover the database. However, since the backup data and old DB logs are stored in a storage medium such as a tape in many cases, data reading requires a long time. Moreover, for the recovery of the database, all the DB logs after the acquisition of the backup data are required to be applied to the backup data. Therefore, when the amount of the DB logs is large, a longer time is required.

In the related art disclosed in JP 2005-018738 A, the storage system recovers the data for each of the blocks of the storage device. The database management system executes the writing to the database asynchronously to the transaction. This raises a problem in that even though the database is recovered for each block, transaction consistency cannot be ensured.

This invention has been made in view of the above problems. It is therefore an object of this invention to provide a method of quickly recovering a database after the occurrence of an error in a database volume.

According to a representative aspect of this invention, there is provided a database recovery method for a computer system, the computer system including: a computer having a database management system; and a storage system for storing data accessed from the computer. The computer includes: a port connected to the storage system; a processor connected to the port; and a memory connected to the processor. The storage system includes: a port connected to the computer; a control unit connected to the port and including a processor and a memory; and a disk drive for storing data which is a target of a write request issued by the computer. The disk drive including: a data volume for storing the data; a snapshot volume corresponding to a copy of the data volume; a database log for storing an update log of the data; and an update journal for storing update information of the data volume. The database management system recording a recovery point for indicating an end point of range to which the update journal is to be applied and a starting point of a range to which the database log is to be applied when the data volume is damaged. The database recovery method being characterized by including: applying the update journal to the snapshot volume up to the recovery point; switching the updated snapshot volume to the data volume; and applying the database log to the data volume that is set by switching after the recovery point.

According to the representative aspect of this invention, after applying the update journal to recover the data, the minimum database logs are applied to ensure the transaction consistency. Therefore, the database can be quickly recovered with the transaction consistency being ensured.

Furthermore, according to the representative aspect of this invention, since the DB logs only after the recovery point need to be managed, a management load on the update log can be reduced.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

Hereinafter, preferred embodiments of this invention will be described.

First Embodiment

Figure 1:
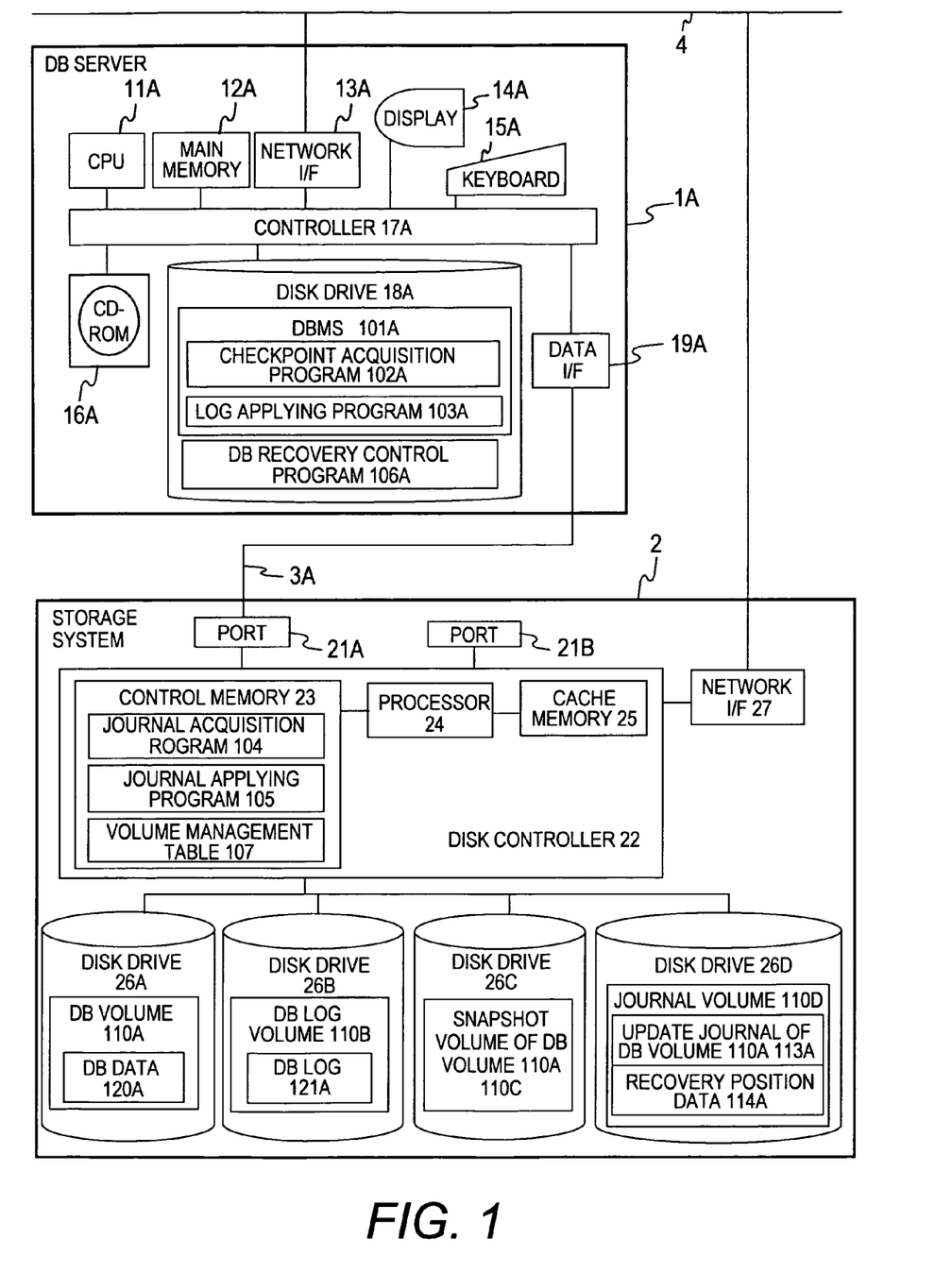
FIG. 1 is a view showing a computer system including a DB server and a storage system according to a first embodiment of this invention.

FIG. 1 is a configuration diagram showing a computer system according to a first embodiment.

The computer system includes a database server (DB server) 1A and a storage system 2. The DB server 1A and the storage system 2 are connected to each other through a first network 3A and a second network 4.

The DB server 1A includes a CPU 11A, a main memory 12A, a network interface 13A, a display 14A, a keyboard 15A, a CD-ROM drive 16A, a controller 17A, a disk drive 18A, and a data interface 19A. The CPU 11A, the main memory 12A, the network interface 13A, the display 14A, the keyboard 15A, the CD-ROM drive 16A, the disk drive 18A, and the data interface 19A are connected to one another via the controller 17A.

The CPU 11A executes programs read out into the main memory 12A to perform various processings.

The main memory 12A reads out and stores data necessary for the programs and the processings executed by the CPU 11A.

The display 14A displays information such as results of processing on a screen.

The keyboard 15A instructs the input of necessary information and the processing to be executed.

The disk drive 18A stores the data necessary for the programs and the processings executed by the CPU 11A. These programs include a database management system 101A and a database recovery control program 106A.

The database management system (DBMS) 101A manages the database serving as shared data. In response to a request for stored data from an application, the DBMS 101A obtains and updates the data stored in the storage system 2.

The DBMS 101A includes a checkpoint acquisition program 102A and a log applying program 103A. As described below with reference to FIG. 6, the checkpoint acquisition program 102A performs a processing such as writing of the updated data in the database to set a checkpoint. The log applying program 103A applies, for example, an update log to the backup data to recover the database.

As described below with reference to FIG. 8, the database recovery control program (DB recovery control program) 106A recovers the database upon occurrence of an error in the DB volume 110A.

The data interface 19A is connected to the first network 3A. The first network 3A is, for example, a network suitable for data transfer using a fibre channel protocol. A plurality of data interfaces 19A may be provided.

The network interface 13A is connected to the second network 4. The second network 4 is, for example, a network using an IP protocol.

The CD-ROM drive 16A supplies a program, which is recorded CD-ROM medium, such as the DBMS 101A to be stored in the disk drive 18A. The CD-ROM drive 16A may be one of other storage media such as a floppy disk drive and a tape reader. These programs may be stored in the disk drive 18A via the network interface 13A.

The storage system 2 includes ports 21A and 21B, a disk controller 22, disk drives 26 (26A to 26D), and a network interface 27. The storage system 2 is connected to the first network 3A via the port 21A. The storage system 2 is also connected to the second network 4A via the network interface 27. Furthermore, the storage system 2 can also be connected to another network via the port 21B.

Each of the disk drives 26 includes a magnetic disk drive. The each of the disk drives 26 may include a plurality of disk drives to constitute a RAID.

A database volume (DB volume) 110A is created in the disk drive 26A. The DB volume 110A stores DB data 120A.

A database log volume (DB log volume) 110B is created in the disk drive 26B. The DB log volume 110B stores a database log (DB log) 121A of the DB data 120A. In the DB log 121A, as described below with reference to FIG. 3, input/output information containing the start and the end of a transaction is recorded.

In the disk drive 26C, a snapshot volume 110C is created. The snapshot volume 110C is a copy of the DB volume 110A at a time when the snapshot is taken. It is not necessary to synchronize the snapshot volume 110C with the DB volume 110A in real time. The snapshot volume 110A may be synchronized with the DB volume 110A in a periodic manner.

In the disk drive 26D, a journal volume 110D is created. The journal volume 110D stores an update journal 113A and recovery position data 114A.

The update journal 113A is, as described below with reference to FIG. 4, update information of the DB volume 110A. Therefore, when the content of the DB data 120A is updated, update information is added to the update journal 113A in accordance with the content of update.

The recovery position data 114A contains, as described below with reference to FIG. 5, a start position (recovery point) to which the DB log 121A is applied when an error occurs in the DB volume 110A. In the first embodiment, the recovery point is a relation between the update journal 113A and the DB log 121A.

The disk controller 22 executes a predetermined processing in response to a request of the DBMS 101A and the DB recovery control program 106A of the DB server 1A. The disk controller 22 includes a control memory 23, a processor 24, and a cache memory 25.

The control memory 23 stores programs and information necessary for the control of the disk drives 26. Specifically, the control memory 23 stores a journal acquisition program 104, a journal applying program 105, and a volume management table 107.

The journal acquisition program 104 operates in cooperation with the checkpoint acquisition program 102A. The journal acquisition program 104 adds, as described below with reference to FIG. 7, update information to the update journal 113A when the DB data 120A is updated. Furthermore, the journal acquisition program 104 adds a record to the recovery position data 114A.

The journal applying program 105 operates in cooperation with the DB recovery control program 106A. The journal applying program 105 applies, as described below with reference to FIG. 9, the update journal 113A to the snapshot volume 110C to reflect the update information.

The volume management table 107 stores, as described below with reference to FIG. 2, an attribute of each of the volumes and a relation between the volumes.

The processor 24 executes processings such as the journal acquisition program 104 and the journal applying program 105.

The cache memory 25 temporarily stores data stored or to be stored in the DB data 120A for high-speed processing of the data write/read.

Next, a table for storing data required to carry out the first embodiment will be described.

Figure 2:
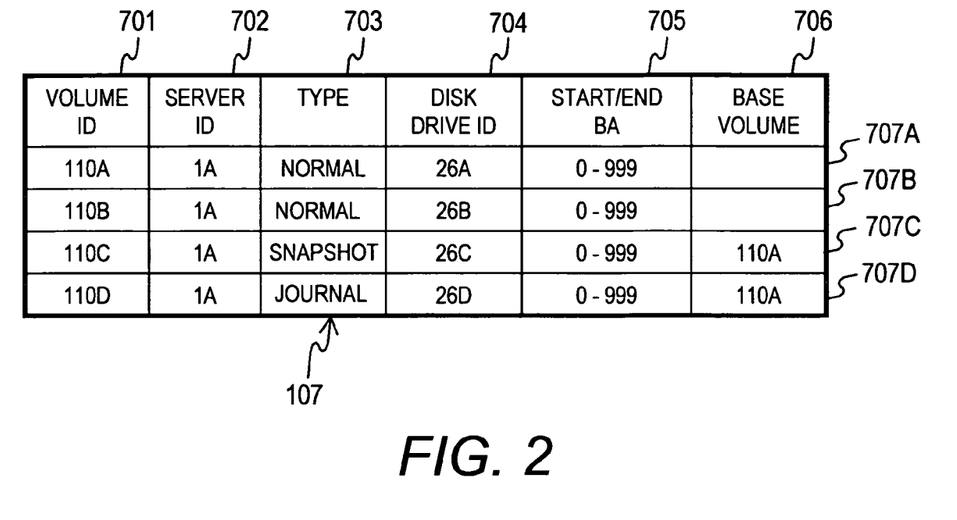
FIG. 2 is a view showing a volume management table according to the first embodiment.

FIG. 2 is a view showing a structure of the volume management table 107. The volume management table 107 stores an attribute of each of the volumes, a relation between the volumes, and a correspondence with the disk drive. In the first embodiment, data of one record is created for one volume in the volume management table 107.

The volume management table 107 includes a volume ID field 701, a server ID field 702, a type field 703, a disk drive ID field 704, a start/end BA field 705, and a base volume field 706.

The volume ID field 701 stores a unique identifier of each of the volumes.

The server ID field 702 stores a unique identifier of a database server accessing the volume.

The type field 703 stores the type indicating the usage of the volume. Specifically, since the DB volume 110A and the DB log volume 110B are directly accessed by the DBMS 101A, they are set as "normal". Since the snapshot volume 110C is a copy of the DB volume 110A, it is set as "snapshot". Since the journal volume 110D stores data of a journal, it is set as "journal".

The disk drive ID field 704 stores a unique identifier of the each disk drive 26 in which the volume is located. The start/end BA field 705 stores a block address at which the volume starts, and a block address at which the volume ends, in the each disk drive 26. Information stored in the disk drive device ID field 704 and the start/end BA field 705 allows the location at which the volume is physically stored, to be specified.

The base volume field 706 stores the volume ID of an acquisition source volume when the type of the volume set in the volume type field 703 is "snapshot" or "journal".

Figure 3:
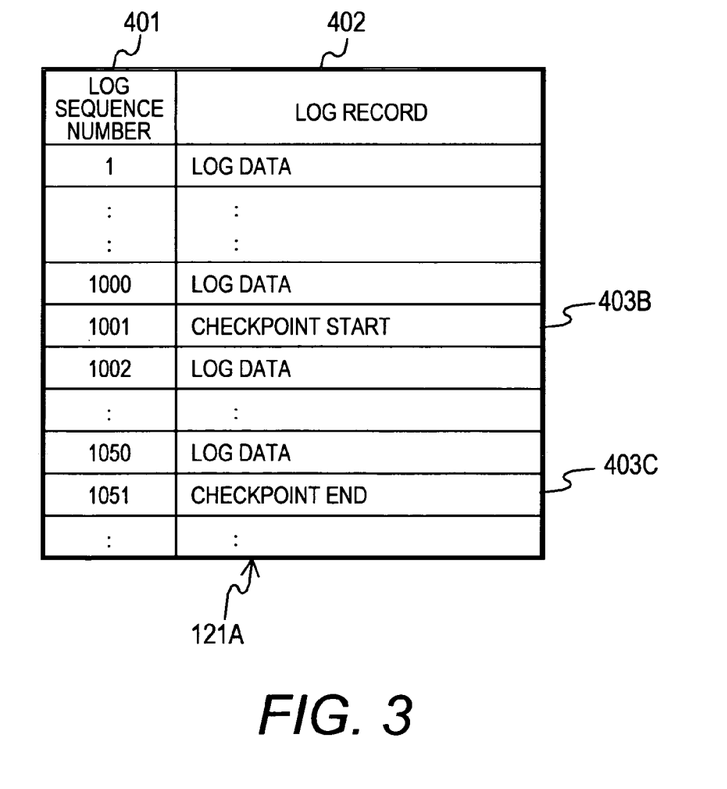
FIG. 3 is a view showing a DB log according to the first embodiment.

FIG. 3 is a view showing a structure of the DB log 121A. The DB log 121A stores an operation history of the DBMS 101A including an update history of the DB data 120A.

The DB log 121A includes a log sequence number field 401 and a log record field 402. The log sequence number field 401 stores a log sequence number corresponding to the order of addition of logs to the DB log 121A. The log record field 402 retains a specific operation content (log data) executed for the database. When the update processing is performed, the log data contains both data before the update and data after the update.

The DBMS 101A executes the DB log applying program 103 to apply the DB log 121A to the backup data and the like, thereby recovering the database. The DBMS 101A uses the data before the update and the data after the update contained in the log data to ensure the transaction consistency. Specifically, when the transaction has already been completed at the occurrence of an error, roll forward is performed to reflect the data after the update. On the other hand, when the transaction has not already been complete at the occurrence of an error, roll back is performed to reflect the data before the update.

Figure 4:
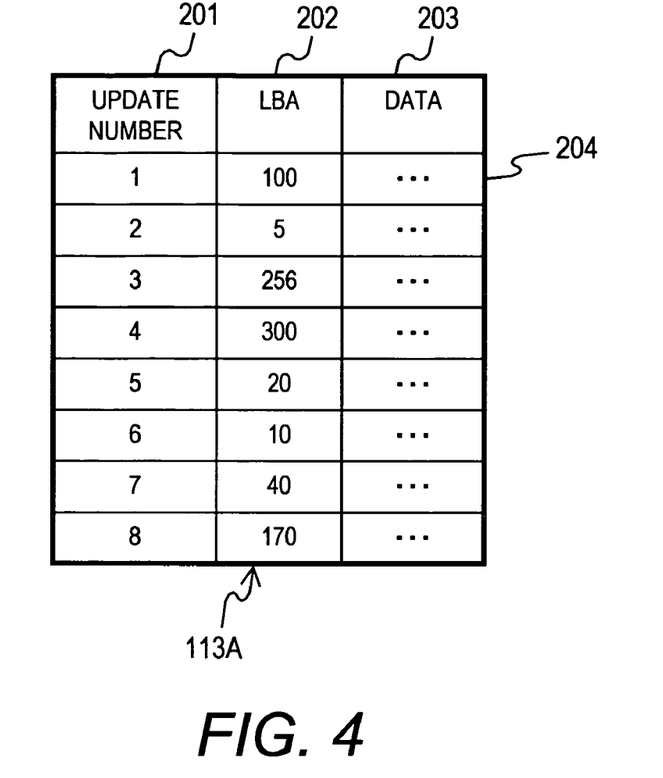
FIG. 4 is a view showing a volume update journal according to the first embodiment.

FIG. 4 is a view showing a structure of the update journal 113A. Records in the update journal 113A correspond to an update history of the DB data 120A. The structure of the update journal 113A differs from that of the DB log 121A in that the update journal 113A retains block addresses and data images as update data. The data image is a direct copy of the content recorded on the disk. The update journal 113A also differs from the DB log 121A in that the update journal 113A retains only the data after the update.

The update journal 113A includes an update number field 201, an LBA field 202, and a data field 203.

The update number field 201 stores an update number indicating the order of update of data. The update number corresponds to a numerical value sequentially increasing from 1. The storage system 2 may automatically add the update number upon insertion of the record.

The LBA field 202 stores a logical block address (LBA) of an area which stores the data after the update.

The data field 203 stores a data image after the update.

Figure 5:
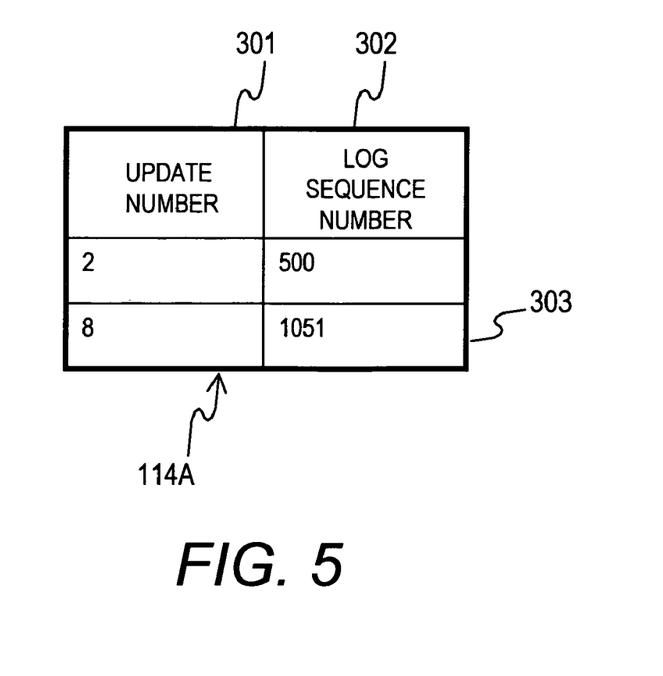
FIG. 5 is a view showing recovery position data according to the first embodiment.

FIG. 5 is a view showing a structure of the recovery position data 114A. The recovery position data 114A stores a recovery point. In the first embodiment, the recovery position data 114A stores a relation of the records between the DB log 112A and the update journal 113A.

The recovery position data 114A includes an update number field 301 and a log sequence number field 302.

The update number field 301 stores an update number of the update journal 113A.

The log sequence number field 302 stores a log sequence number of the DB log 121A which corresponds to the update number.

Although the recovery position data 114A is stored in the journal volume 110D as described above, the recovery position data 114A may also be stored in the disk drive 18A of the DB server 1A.

A processing of recovering the database according to this invention will now be described. In the first embodiment, the database recovering processing can be divided into two processings: a recording processing of a recovery point during the normal operation of the computer system; and a database recovery processing at the occurrence of an error.

First, the recording processing of a recovery point during the normal operation of the computer system will be described.

Figure 6:
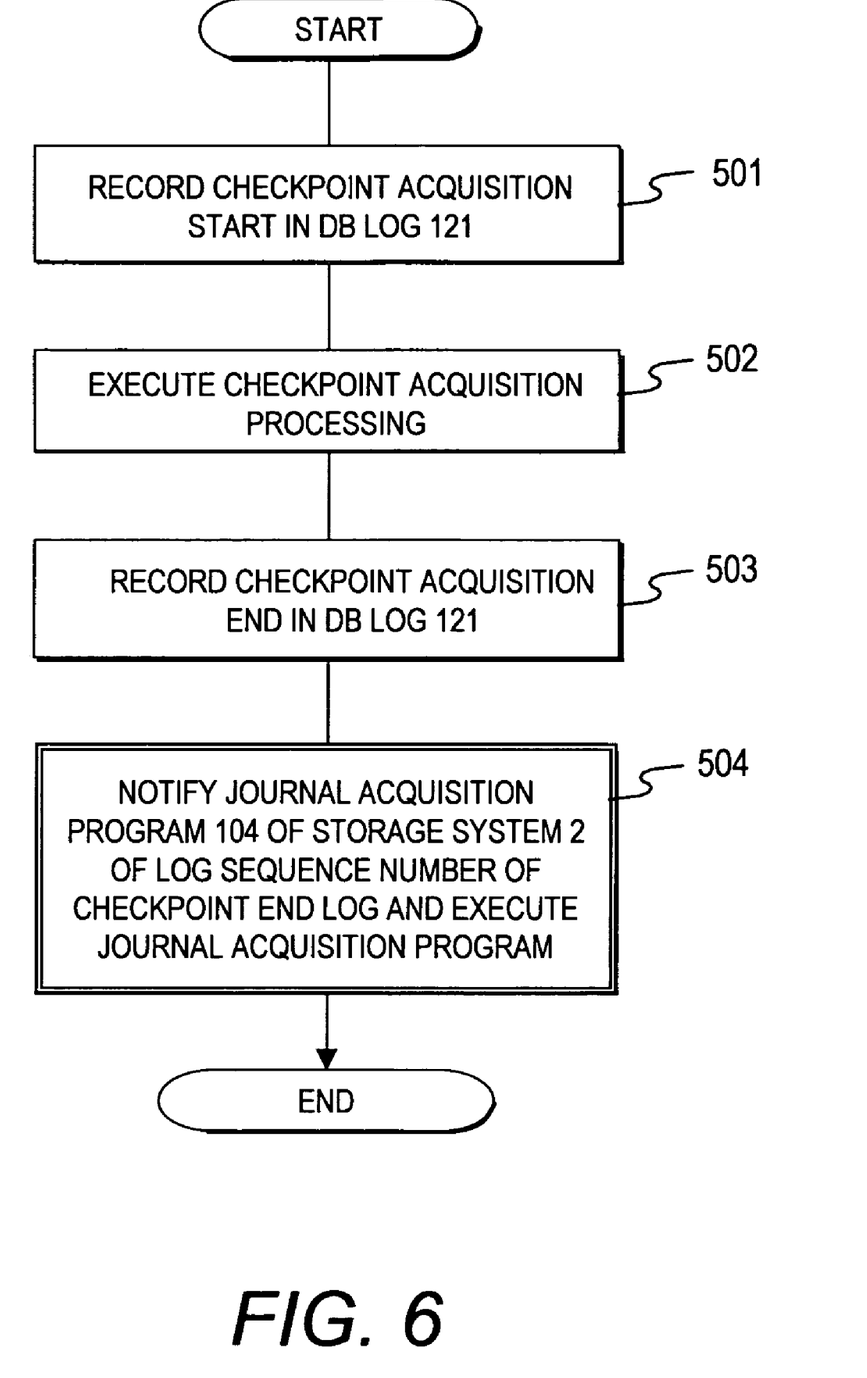
FIG. 6 is a flowchart of a processing executed in a checkpoint acquisition program according to the first embodiment.

FIG. 6 is a flowchart of the checkpoint acquisition program 102A.

Herein, a so-called checkpoint will be described. The update data is actually recorded in the DB volume 110A not simultaneously with the completion of a transaction but in a periodic manner or together with a specific processing. The checkpoint is a timing at which the update data is recorded in the DB volume 110A. Setting of the checkpoint also includes a processing of recording the update data in the DB volume 110A.

The DBMS 101A periodically executes the checkpoint acquisition program 102A. The DBMS 101A may execute the checkpoint acquisition program 102A when a certain amount of the update data or a larger amount thereof is accumulated without being recorded in the DB volume 110A.

First, the DBMS 101A adds a checkpoint acquisition start to the DB log 121A (Step 501).

Next, the DBMS 101A executes a checkpoint acquisition processing (Step 502). The checkpoint acquisition processing records the update data in the DB volume 110A to obtain a checkpoint.

Upon completion of the checkpoint acquisition processing, the DBMS 101A adds a checkpoint acquisition end to the DB log 121A (Step 503).

Next, the DBMS 101A notifies the storage system 2 of the log sequence number of the checkpoint acquisition end log and the volume ID of the DB volume 110A to execute the journal acquisition program 104 (Step 504).

Figure 7:
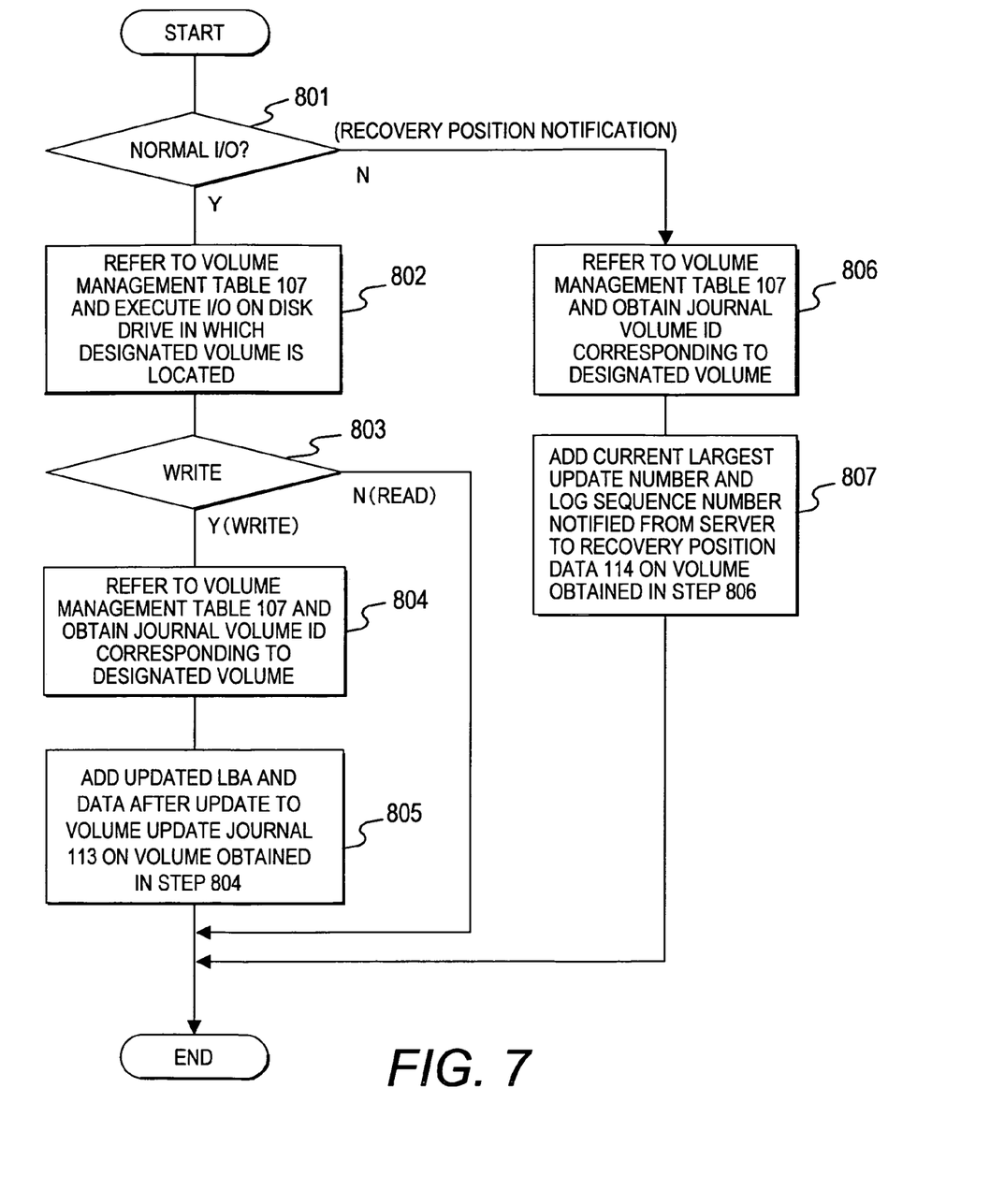
FIG. 7 is a flowchart of a processing executed in a journal acquisition program according to the first embodiment.

FIG. 7 is a flowchart of the journal acquisition program 104. The journal acquisition program 104 adds the update information to the update journal 113A and records the recovery point in the recovery position data 114A.

The storage system 2 receives a notification from the DB server 1A to activate the journal acquisition program 104. The journal acquisition program 104 is stored in the control memory 23 and is executed by the processor 24.

First, the storage system 2 judges whether an execution instruction from the DB server 1A is a normal input/output instruction or a recovery position notification (Step 801). When the journal acquisition program 104 is activated from the checkpoint acquisition program 102A, the DBMS 101 sets a value of a recovery position notification flag to ON. The storage system 2 judges a process to be executed depending on the value of the recovery position notification flag.

When the execution instruction from the DB server 1A is a normal input/output instruction, the storage system 2 refers to the volume management table 107 based on the value of the volume ID notified from the DB server 1A. Then, the storage system 2 executes an input/output processing on the disk drives 26 in which the designated volume is located (Step 802).

Next, the storage system 2 judges whether the instructed processing is write or read (Step 803). When the instructed processing is write, the storage system 2 refers to the volume management table 107 to obtain a journal volume ID corresponding to the designated volume (Step 804).

Next, the storage system 2 adds an updated LBA and the data after the update to the update journal 113A to be stored in the obtained journal volume 110D (Step 805).

On the other hand, when the execution instruction from the DB server 1A is a recovery position notification, the storage system 2 obtains a journal volume ID corresponding to the designated volume based on the notified volume ID and the volume management table 107 (Step 806). The processing is the same as the processing of Step 804 described above.

Next, the storage system 2 adds the largest update number of the update journal 113A and the log sequence number of the DB log 121A notified from the server to the recovery position data 114A to be stored in the obtained journal volume 110D (Step 807).

Herein, the database recovery processing at the occurrence of an error will be described. The schema of the database recovery processing is as follows. First, the update journal 114 is applied to the snapshot volume 110C. Next, the snapshot volume 110C is switched to the DB volume. Finally, the DB log 121A is applied to the DB volume after switching to ensure the transaction consistency.

Figure 8:
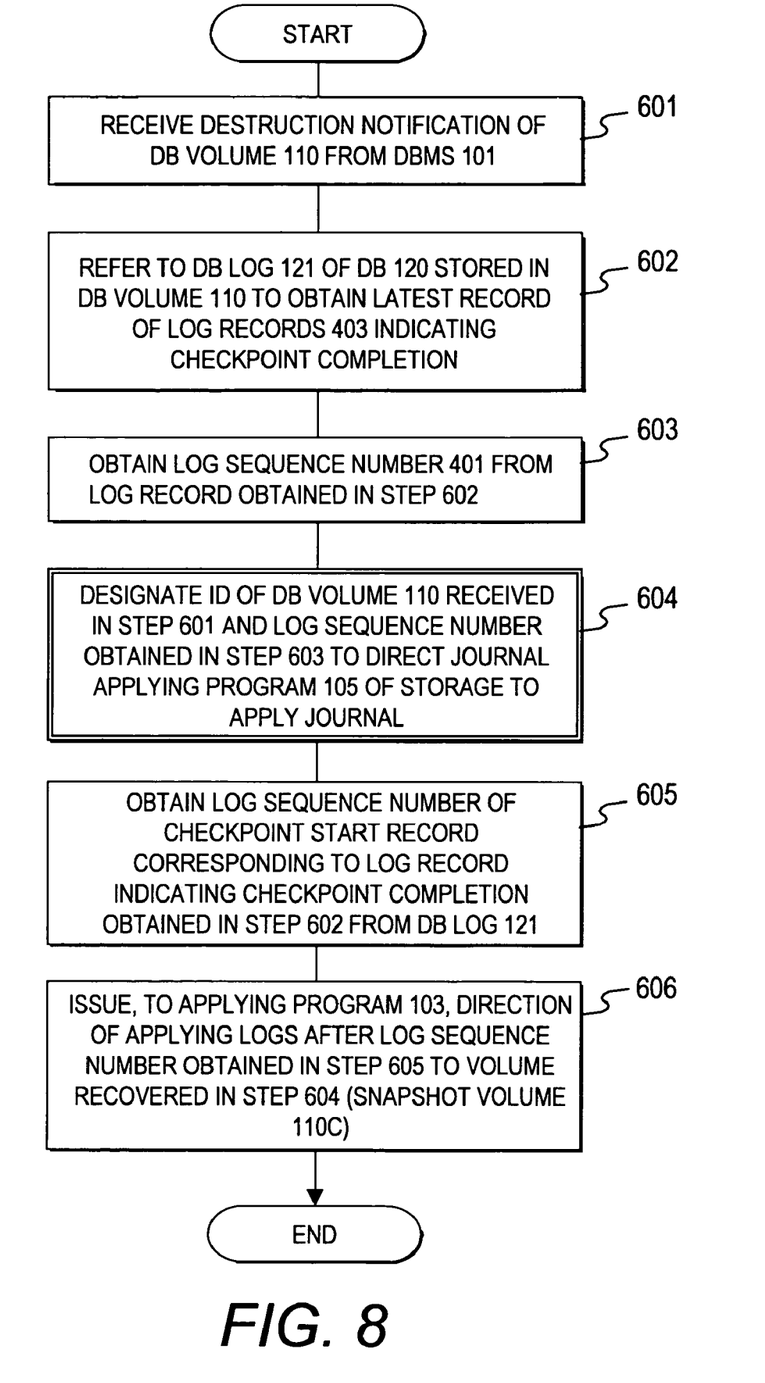
FIG. 8 is a flowchart of a processing executed in a DB recovery control program according to the first embodiment.

FIG. 8 is a flowchart of the DB recovery control program 102 for performing a database recovery processing. The DB recovery control program 102 resides in the main memory 12A together with the DBMS 101A during the operation of the DB server 1A.

Upon activation of the DB recovery control program 102, the DB server 1A waits in Step 601 until a destruction notification of the DB volume 110A is received. The destruction notification is transmitted together with the volume ID of the DB volume 110A when the DBMS 101A detects the occurrence of an error in the DB volume 110A. The occurrence of an error in the DB volume 110A is judged based on the reason why the DBMS 101A has failed to access the DB volume 110A.

Upon reception of the destruction notification of the DB volume 110A (Step 601), the DB server 1A refers to the DB log 120 to obtain the latest record indicating the checkpoint acquisition completion (Step 602). Furthermore, the DB server 1A obtains a value of the log sequence number 401 from the obtained record (Step 603).

Next, the DB server 1A notifies the storage system 2 of the volume ID notified in Step 601 and the log sequence number 401 obtained in Step 603 to instruct the execution of the journal applying program 105 (Step 604). The storage system 2 executes the journal applying program 105 to apply the update journal 113A to the snapshot volume 110C. After that, the storage system 2 switches the snapshot volume 110C to the DB volume. The details of the processing of the journal applying program 105 will be described below with reference to FIG. 9.

Next, the DB server 1A obtains the log sequence number 401 of the record which indicates the checkpoint acquisition start corresponding to the record indicating the checkpoint acquisition completion obtained in Step 603, from the DB log 121A (Step 605).

Finally, the DB server 1A executes the log applying program 103A of the DBMS 101A (Step 606). The log applying program 103A applies the logs after the log sequence number obtained in Step 605 to the DB volume after the switching.

Figure 9:
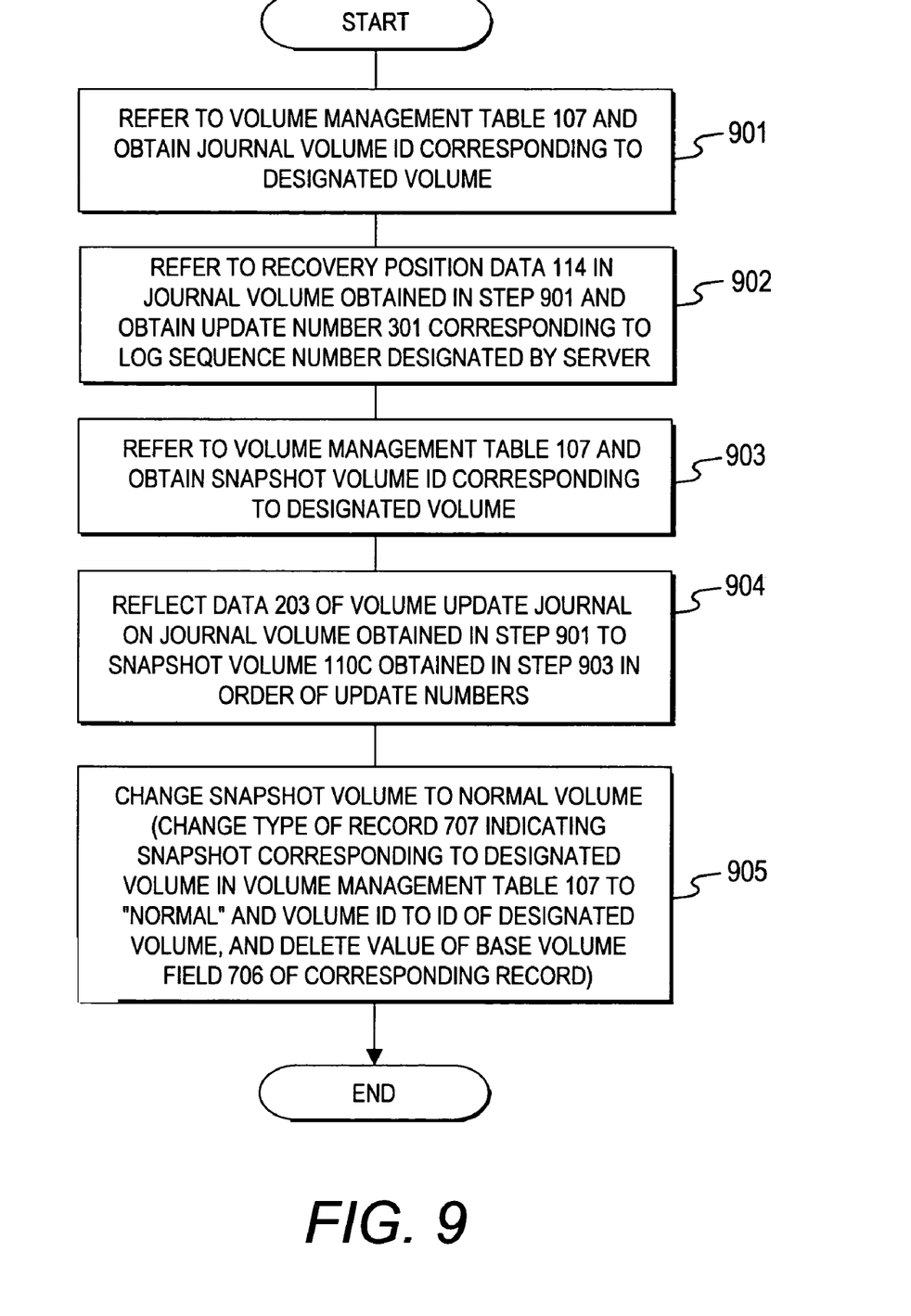
FIG. 9 is a flowchart of a processing executed in a journal applying program according to the first embodiment.

FIG. 9 is a flowchart of the journal applying program 105. The journal applying program 105 is executed upon reception of an activation instruction from the DB recovery control program 102. The storage system 2 is notified of the activation instruction of the journal applying program 105 together with the volume ID of the damaged DB volume 110A and the log sequence number when the latest checkpoint is set.

The storage system 2 refers to the volume management table 107 based on the volume ID notified from the DB server 1A to obtain the corresponding journal volume 110D (Step 901).

Next, the storage system 2 refers to the recovery position data 114A in the journal volume 110D obtained in Step 901. Then, the storage system 2 obtains a value of the update number 301 corresponding to the log sequence number notified from the DB server 1A (Step 902).

Next, the storage system 2 refers to the volume management table 107 based on the volume ID notified from the DB server 1A to obtain the corresponding snapshot volume 110C (Step 903).

Next, the storage system 2 applies the update journal 113A to the snapshot volume 110C obtained in Step 903 (Step 904). Specifically, the content in the data field of the update journal 113A is overwritten in the order of the update numbers for the address obtained from the LBA field up to the update number obtained in Step 902.

Finally, the storage system 2 switches the snapshot volume 110C to the DB volume (Step 905). Specifically, for the record corresponding to the snapshot volume 110C stored in the volume management table 107, the type is changed from "snapshot" to "normal". Next, the record corresponding to the damaged DB volume 110A is deleted from the volume management table 107. Furthermore, the volume ID of the snapshot volume 110C is rewritten to the volume ID of the damaged DB volume 110A.

The function of the database recovery method according to the first embodiment will now be described by taking the data described in the tables shown in FIG. 2 to FIG. 5 as an example.

First, the processing in a case where the DBMS 101A performs the normal input/output on the DB data 120A will be described.

The DBMS 101A executes the checkpoint acquisition program 102A shown in FIG. 6 so as to write the update data stored in the main memory 12A to the DB volume 110A.

The DBMS 101A first records the log record 403B indicating the checkpoint start in the DB log 121A (Step 501). Assuming that 1000 records are stored in the DB log 121A at this time, the log sequence number of the added record 403B is "1001" as shown in FIG. 3.

Next, the DBMS 101A executes the checkpoint acquisition processing (Step 502). In the checkpoint acquisition processing, the update data stored in the main memory 12A is written to set the checkpoint. At this time, the DBMS 101A transmits a write instruction to the storage system 2 via the data interface 19. Upon reception of the write instruction, the storage system 2 executes the journal acquisition program 104.

Hereinafter, referring to FIG. 7, a processing of the journal acquisition program 104 will be described.

The write instruction received by the storage system 2 from the DBMS 101A is a normal input/output (the result in Step 801 is "Y"). The storage system 2 also receives the volume ID, the LBS, and the update data together with the write instruction. Herein, the volume ID is "110A" corresponding to the volume ID of the DB volume 110A, and the LBA is "100".

The storage system 2 obtains a disk drive ID corresponding to a write target based on the received volume ID. The storage system 2 searches the volume management table 107 for the record having the volume ID identical with the received volume ID. Since the storage system 2 has received the volume ID "110A", the storage system 2 obtains a record 707A having the identical volume ID. As a result, the storage system 2 can recognize that an input/output target is the disk drive 26a from the value of the disk drive ID in the obtained record 707A.

Furthermore, the storage system 2 adds the start block address to the received LBA to specify the block address to which the update is written. The start block address is stored in the start/end BA field 705 of the record 707A. Therefore, the storage system 2 adds the received LBA "100" to the start block address "0" stored in the record 707A to write the received update data in the block address "100" (Step 802).

After that, since the input/output instruction is a write instruction (the result in Step 803 is "Y"), the storage system 2 records the update information in the update journal 113A.

The storage system 2 first obtains the journal volume corresponding to the received volume ID (Step 804). Specifically, the storage system 2 searches the volume management table 107 for the record having the base volume identical with the received volume ID and the type "journal". As a result, the storage system 2 obtains a record 707D satisfying the above conditions.

The storage system 2 records the update information in the update journal 113A stored in the journal volume 110D (Step 805). Although the record has already been added to the update journal 113A shown in FIG. 4, the record is not stored yet at this point of time.

Specifically, the storage system 2 adds a record 204 to the update journal 113A. Since the record 204 is the first record in the update journal 113A, "1" is set as the update number. In the LBA field and the data field of the record 204, the LBA "100" and the update data transmitted together with the input/output instruction from the DBMS 101A are stored.

The DBMS 101A and the storage system 2 similarly process the other update data which have not been written to the DB volume 110A yet. In this manner, the records with the update numbers 1 to 8 are added to the update journal 113A as shown in FIG. 4.

Upon completion of the write of the update data to the DB volume 110A, the process returns again to the checkpoint acquisition program 102A.

After that, the DBMS 101A records a log record 403C indicating the checkpoint end in the DB log 121A (Step 503). Since the DBMS 101A performs another processing in parallel with the execution of the checkpoint acquisition program 102A, the log data are continuously accumulated. Therefore, the records with the log sequence numbers 1002 through 1050 are added from the start of acquisition of the checkpoint to the end of the acquisition. As a result, as shown in FIG. 3, the log sequence number of the record 403C is "1051".

After that, the DBMS 101A records a recovery position corresponding to a starting point of the recovery processing at the occurrence of an error. Specifically, the DBMS 101A transmits a recovery position notification as an input/output instruction to the storage system 2. The DBMS 101A notifies the storage system 2 of the log sequence number "1051" of the record 403C indicating the end of the acquisition of the checkpoint together with the input/output instruction (Step 504). At this time, the DBMS 101A sets the recovery position notification flag to "ON".

Upon reception of the recovery position notification, the storage system 2 executes the journal acquisition program 104. Referring to FIG. 7 again, a recovery position notification processing of the journal acquisition program 104 will now be described.

The recovery position notification received by the storage system 2 also includes the volume ID "110A" of the DB volume 110A to be recovered in addition to the log sequence number "1051" of the checkpoint end log.

The storage system 2 refers to the recovery position notification flag to judge that the received input/output instruction is not a normal input/output (the result in Step 801 is "N").

Next, the storage system 2 searches the volume management table 107 for a record having the value of the base volume identical with the received volume ID "110A" and the type "journal" (Step 806). As a result, the storage system 2 obtains a record 707D satisfying the above conditions.

The storage system 2 adds a record 303 to the recovery position data 114A stored in the journal volume 110D (Step 807). The recovery position data 114A stores a relation between the latest update number 302 of the update journal 113A and the log sequence number 401 of the checkpoint end log of the DB log 121A. Therefore, as the record 303, "8" which is obtained by referring to the update journal 113A is stored in the update number field 301, while the notified log sequence number "1051" is stored in the log sequence number field 302.

When the addition of the data to the recovery position data 114A is completed, the processing of the journal acquisition program 104 is also completed. After that, the storage system 2 returns the processing to the DBMS 101A. The processing of the checkpoint acquisition program 102A is completed with the addition of the data to the recovery position data 114A.

As described above, the DBMS 101A executes the checkpoint acquisition program 102A to record the recovery point in the recovery position data 114A of the storage system 2 simultaneously with the write of the update data.

Next, a processing of recovering the DB data 120A at the occurrence of an error in the disk drive 26A will be described.

The DB recovery control program 102 is executed with the activation of the DB server 1A and resides in the main memory 12A during the normal operation. The DB server 1A puts the processing of the DB recovery control program 102 on standby until the DB server 1A receives a destruction notification of the DB volume 110A (Step 601).

The destruction notification is issued when the DBMS 101A detects the occurrence of an error in the DB volume 110A. The occurrence of an error in the DB volume 110A is judged based on the reason why the DBMS 101A has failed to access the DB volume 110A and the like.

Upon reception of the destruction notification of the DB volume 110A, the DB server 1A obtains the latest record indicating the checkpoint acquisition completion from the DB log 120 (Step 602). Referring to FIG. 3, the record 403C corresponds to the latest record. The DB server 1A obtains the log sequence number "1051" from the record 403C (Step 603).

After that, the DB server 1A instructs the storage system 2 to execute the journal applying program 105 (Step 604). At this time, the DB server 1A notifies the storage system 2 of the volume ID "110A" of the DB volume 110A and the log sequence number "1051" (Step 604).

Upon reception of the notification from the DB server 1A, the storage system 2 executes the journal applying program 105.

The storage system 2 first obtains a journal volume corresponding to the received volume ID (Step 901). Specifically, the storage system 2 searches the volume management table 107 for a record having the base volume identical with the received volume ID and the type "journal". As a result, the storage system 2 obtains a record 707D satisfying the above conditions. In this example, the journal volume 110D is obtained.

Next, the storage system 2 refers to the recovery position data 114A stored in the journal volume 110D. The storage system 2 searches through the recovery position data 114A based on the log sequence number notified from the DB server 1A to obtain a corresponding update number (Step 902). According to FIG. 5, since the notified log sequence number is "1051", the record 303 is found in the search and the update number "8" is obtained.

Next, the storage system 2 first obtains a snapshot volume corresponding to the received volume ID (Step 903). Specifically, the storage system 2 searches the volume management table 107 for a record having the base volume identical with the received volume ID and the type "snapshot". As a result, the storage system 2 obtains a record 707C satisfying the above conditions. In this example, the snapshot 110C is obtained.

Next, the storage system 2 applies the update information stored in the update journal 113A to the snapshot volume 110C (Step 904). The storage system 2 applies the update information up to the update number obtained in Step 902 in the order of the update numbers.

Specifically, for example, when the record 204 of the update journal 113A is applied, the storage system 2 adds the logical block address "100" to the start block address "0" of the snapshot volume 110C to obtain an absolute address "100". Then, the storage system 2 overwrites the content of the data field 203 to the obtained address.

In this manner, the update information up to the latest checkpoint is reflected on the snapshot volume 110C. At this time, the storage system 2 deletes the update information in the update journal 113A on which the update is reflected. In this manner, the application start position of the update journal is no longer required to be retained.

By the processing described above, the DB data 120A is recovered to the point at which the update information up to the update number 8 is reflected on the snapshot volume 110C.

After that, the storage system 2 changes the snapshot volume 110C to the DB volume (Step 905). Specifically, the storage system 2 first deletes the record 707A corresponding to the damaged DB volume 110A stored in the volume management table 107. Then, the storage system 2 changes the volume ID of the record 707C corresponding to the snapshot volume 110C from "110C" to the volume ID "110A" notified from the DB server 1A. Furthermore, the storage system 2 changes the type 703 to "normal" to erase the value of the base volume 706.

Upon completion of the switching of the DB volume, the processing of the journal applying program 105 is terminated and the storage system 2 returns the processing to the DB server 1A.

At this time, the update up to the latest checkpoint is reflected on the DB data 120A after the switching of the DB volume. Therefore, the update information after the checkpoint is not reflected and the transaction consistency is not ensured. Accordingly, the DB server 1A applies the DB log 121A to the DB data 120A after the switching so as to ensure the transaction consistency.

The DB server 1A first obtains a checkpoint acquisition start record corresponding to the checkpoint acquisition completion record 403C obtained in Step 603 from the DB log 121A (Step 605). In this example, the record 403B having the log sequence number "1001" corresponds to the checkpoint acquisition start record.

Next, the DB server 1A executes the log applying program 103A to apply the log records after the log sequence number "1001" to the DB data 120A after the switching. The roll forward is performed for the data for which a commit has been completed before the occurrence of an error and the roll back is performed for the data for which a commit has not been completed so as to ensure the transaction consistency.

By the above processing, the execution of the log applying program 103A is completed to end the database recovery processing.

According to the first embodiment, the DB server 1 uses both the database recovery using the update journal 113A and the recovery using the DB log 121A. Moreover, the recovery point is set in conjunction with the checkpoint so that the range recovered by the journal applying program 105 is as large as possible while the transaction consistency is being ensured.

Since the processing with the journal applying program 105 is completed in the storage system 2, the amount of transfer data between the DB server 1A and the storage system 2 can be reduced. Furthermore, since the update data is directly written to the absolute address of the disk drive, the data can be restored at a high speed.

For the update data after the latest checkpoint, the DB log 121A is applied to the data after the application of the update journal 113A, thereby ensuring the transaction consistency with certainty.

Therefore, according to the first embodiment, the database can be recovered at a high speed while the transaction consistency is being ensured.

Furthermore, according to the first embodiment, the DB logs 121A only after the checkpoint need to be retained. Therefore, the DB logs 121A before the checkpoint are saved to reduce the number of update logs to be managed, thereby reducing a management load.

Second Embodiment

In a second embodiment, the case where the database recovery method according to this invention is applied to a computer system including a plurality of database servers will be described. The components having the same functions as those of the components in the first embodiment are denoted by the same reference numerals, and the description thereof is appropriately omitted.

Figure 10:
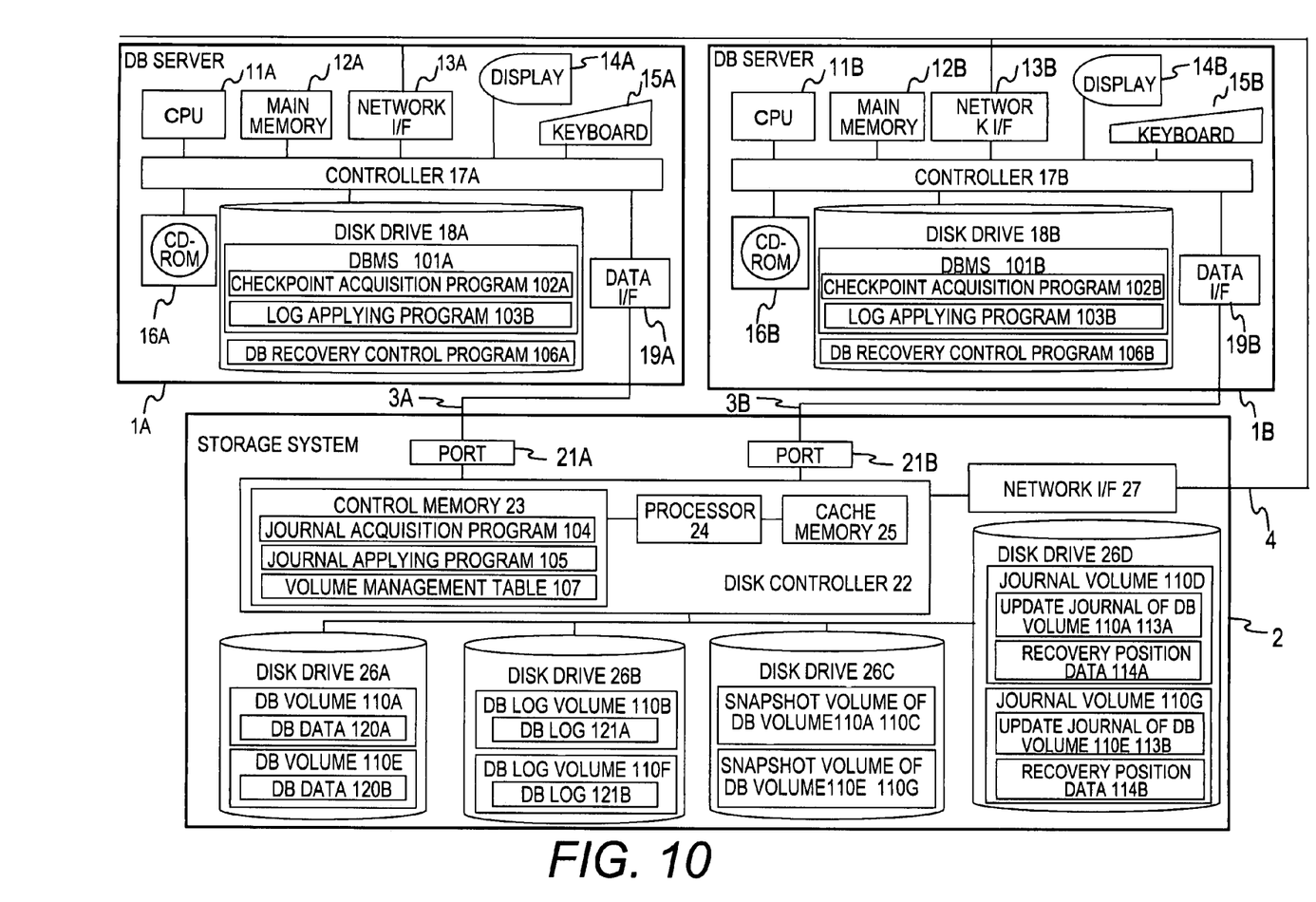
FIG. 10 is a view showing a computer system including a plurality of DB servers and a storage system according to a second embodiment of this invention.

FIG. 10 shows a configuration of a computer system including two DB servers 1A and 1B. In the computer system according to the second embodiment, the two DB servers 1A and 1B access the storage system 2. A configuration of the DB server 1A is the same as that of the DB server 1A in the first embodiment. A configuration of the DB server 1B is approximately the same as that of the DB server 1A in the first embodiment.

The DB server 1A is connected to the first network 3A via the data interface 19A in the same manner as in the first embodiment. Similarly, the DB server 1B is connected to a third network 3B via the data interface 19B. Furthermore, the DB server 1A is connected to the second network 4 via the network interface 13A. The DB server 1B is connected to the second network 4 via the network interface 13B.

A configuration of the storage system 2 is approximately the same as that of the storage system 2 in the first embodiment. The storage system 2 includes the ports 21A and 21B. The storage system 2 is connected to the DB server 1A through the first network 3A via the port 21A. Similarly, the storage system 2 is connected to the DB server 1B through the third network 3B via the port 21B.

The disk drives 26A to 26D respectively include volumes 110E to 110H accessed by the DB server 1B in addition to the volumes 110A to 110D accessed by the DB server 1A. The respective usages of the volumes 110E to 110H are the same as those of the volumes 110A to 110D stored in the same disk drive. For example, the DB volume 110E is located in the disk drive 26A including the DB volume 110A. The same applies to the other volumes 110F to 110H.

The DB volume 110E stores DB data 120B accessed by a DBMS 101B. Similarly, the DB log volume 110F stores a DB log 121B. Furthermore, the journal volume 110H stores an update journal 113B of the DB volume 110E and recovery position data 114B.

Figure 11:
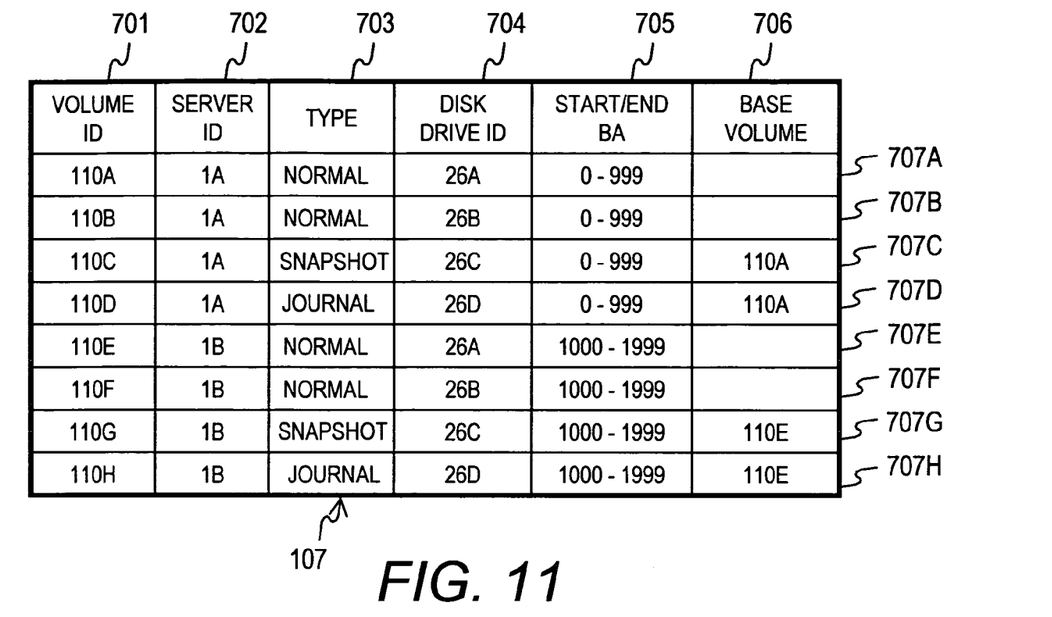
FIG. 11 is a view showing a volume management table according to the second embodiment.

The volume management table 107 stores and manages information of each of the volume as in the first embodiment. The volumes 110E to 110H are specifically represented as records 707E to 707H as shown in FIG. 11. The records 707A to 707D represent the same volumes 110A to 110D as those in the first embodiment.

Figure 12:
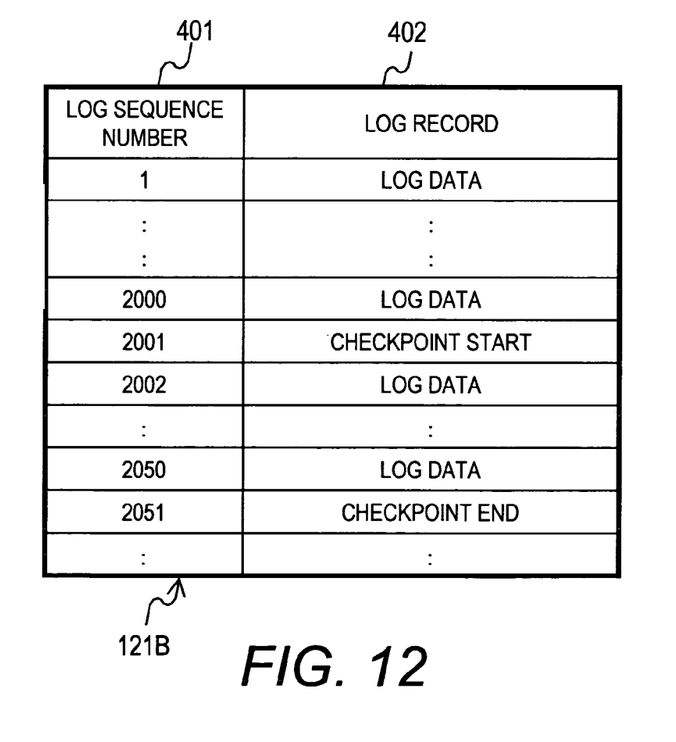
FIG. 12 is a view showing a DB log in a second database according to the second embodiment.
Figure 13:
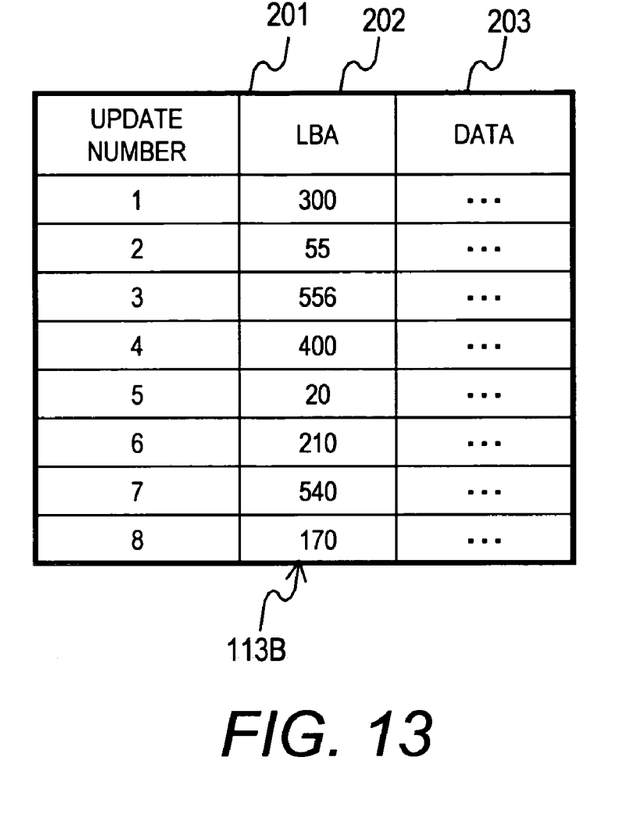
FIG. 13 is a view showing a volume update journal of a second database volume according to the second embodiment.
Figure 14:
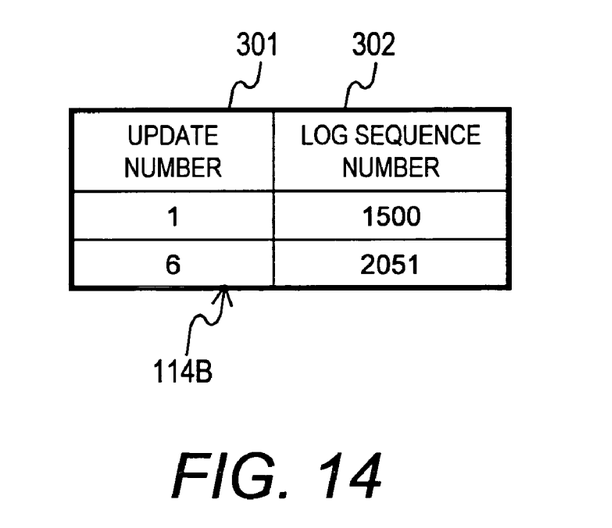
FIG. 14 is a view showing recovery position data of the second database volume according to the second embodiment.

FIG. 12 shows an example of the DB log 121B of the DB volume 110E. FIG. 13 shows an example of the update journal 113B of the DB volume 110E. Furthermore, FIG. 14 shows an example of the recovery position data 114B of the DB volume 110E. Structures of these tables are all the same as those of the tables in the first embodiment. In these tables, data based on an access by the DBMS 101B is recorded.

Hereinafter, a method of recovering the DB data 120A and 120B at the occurrence of an error in the disk drive 26A will be described.

The computer system according to the second embodiment has the configuration shown in FIG. 10. The volume management table 107 stores the data shown in FIG. 11. The structures and the contents of the other data are the same as the data shown in FIG. 3 to FIG. 5 for the DB server 1A and the same as the data shown in FIGS. 12 to 14 for the DB server 1B. The program stored in each of the DB servers is the same as that in the first embodiment.

Upon detection of destruction of the disk drive 26A, the DBMS 101A executes the DB recovery control program 106A to recover the database. Similarly, the DBMS 101B executes the DB recovery control program 106B.

Each of the DB recovery control programs 106A and 106B executes the processing shown in FIG. 8 in an independent manner. Therefore, each of the DB recovery control programs 106A and 106B notifies the storage system 2 to execute the journal applying program 105. Therefore, the storage system 2 independently performs the processing shown in FIG. 9. Since the specific content of the processing is the same as that in the first embodiment, the description thereof is herein omitted.

After that, the DB volume 110A is switched to the snapshot volume 110C, while the DB volume 110E is switched to the snapshot volume 110G. Furthermore, since the log applying programs 103A and 103B are applied, each of the DB data 120A and 120B after the switching of the volume is recovered while the transaction consistency is being ensured.

As described above, the database recovery method according to this invention can be applied even to the computer system including a plurality of database servers.

Therefore, even for a large-scale computer system in which a plurality of database servers operate in cooperation with each other, at the occurrence of an error in the disk drive, the database can be recovered within a short period of time to the point at which the transaction consistency is ensured.

While the present invention has been described in detail and pictorially in the accompanying drawings, the present invention is not limited to such detail but covers various obvious modifications and equivalent arrangements, which fall within the purview of the appended claims.

What is claimed is:

1. A database recovery method for a computer system comprising
   a server having a database management system and a storage system having a control unit and a disk drive,
   wherein the control unit configures, by use of the disk drive, a data volume to store a database data managed by the database management system, a snapshot volume corresponding to a copy of the data volume, configured by the control unit, a database log volume storing database logs of the database data, and a journal volume storing update journals of the data volume,
   wherein the update journals are created by the control unit,
   wherein the database logs are created by the database management system, and
   wherein the database management system records a plurality of recovery points, each of the plurality of recovery points indicates an end point of a range to which one or a plurality of the update journals stored in the journal volume are to be applied and a starting point of the range from which one or a plurality of the database logs stored in the database log volume are to be applied, when the data volume is damaged,
   the database recovery method comprising:
   at the database management system, identifying a latest recovery point from the plurality of recovery points;
   at the control unit, applying a part of the update journals in the journal volume to the snapshot volume up to the end point of the range indicated by the latest recovery point;
   at the control unit, switching the snapshot volume to the data volume to be accessed by the server; and
   at the server, applying a part of the database logs from the starting point of the range indicated by the last recovery point to a point ensuring a transaction consistency of the database management system to the snapshot volume that is switched to the data volume to be accessed by the server.

2. The database recovery method according to claim 1, wherein the update journals include data images of the data volume after being updated.

3. The database recovery method according to claim 1, wherein the applying of the part of the update journals is executed by the storage system.

4. The database recovery method according to claim 1, wherein the recovery points includes a relation between the database logs and the update journals.

5. The database recovery method according to claim 1, wherein:

the database management system temporarily accumulates the update journals, sets a checkpoint for collectively recording the accumulated update journals at a predetermined time in the data volume, and records the recovery point upon setting of a latest checkpoint.

6. The database recovery method according to claim 5, wherein:

the checkpoint is recorded in the database log volume; and the recovery point includes a relation between the checkpoint recorded in the database log volume and the latest update information of the update journals.

7. A computer system, comprising:

a server having a database management system; and a storage system having a control unit and a disk drive wherein the control unit configures, by use of the disk drive, a data volume to store a database data managed by the database management system, a snapshot volume corresponding to a copy of the data volume, configured by the control unit, a database log volume storing database logs of the database data, and a journal volume storing update journals of the data volume;

wherein the update journals are created by the control unit;

wherein the database logs are created by the database management system;

wherein the database management system records a plurality of recovery points, each of the plurality of recovery points indicates an end point of a range to which one or a plurality of the update journals stored in the journal volume are to be applied and a starting point of the range from which one or a plurality of the database logs stored in the database log volume are to be applied, when the data volume is damaged during a normal operation of the computer system, and identifies a latest recovery point from the plurality of recovery points;

wherein the control unit applies a part of the update journals in the journal volume to the snapshot volume up to the end point of the range indicated by the latest recovery point when an error occurs in the data volume, and switches the snapshot volume to the data volume to be accessed by the server; and wherein the server applies a part of the database logs from the starting point of the range indicated by the last recovery point to a point ensuring a transaction consistency of the database management system to the snapshot volume that is switched to the data volume to be accessed by the server.

8. The computer system according to claim 7, wherein the update journals include data images of the data volume after being updated.

9. The computer system according to claim 7, wherein the storage system applies the part of the update journals.

10. The computer system according to claim 7, wherein the recovery points include a relation between the database logs and the update journals.

11. The computer system according to claim 7, wherein the database management system temporarily accumulates the update journals, collectively records the accumulated update data at a predetermined time in the data volume, and records the recovery point upon setting of the latest checkpoint.

12. The computer system according to claim 11, wherein:

the checkpoint is recorded in the database log volume; and the recovery point includes a relation between the checkpoint recorded in the database log volume and the latest update information of the update journals.

* * * * *